United States Patent [19]

Paul et al.

[11] 4,301,845
[45] Nov. 24, 1981

[54] TREE SHEAR

[76] Inventors: Lowell A. Paul; Alan Moss, both of 1334 St. Paul St., Kelowna, British Columbia, Canada, V1Y 2E6

[21] Appl. No.: 118,159

[22] Filed: Feb. 4, 1980

[51] Int. Cl.³ ............................................. A01G 23/08
[52] U.S. Cl. .................................. 144/34 E; 144/3 D
[58] Field of Search ............... 144/3 D, 34 R, 34 E, 144/309 AC; 83/928; 30/194, 244, 245, 278

[56] References Cited

U.S. PATENT DOCUMENTS 3,610,301 10/1971 Jordan ........................... 144/134 E
3,646,975 3/1972 McNeil, Jr. et al. ............. 144/34 E
3,976,111 8/1976 Jonsson ............................ 144/34 E

*Primary Examiner*—W. D. Bray
*Attorney, Agent, or Firm*—Townsend and Townsend

[57] ABSTRACT

A tree shear comprises a base with a tree receiving position. There is an undercutting blade mounted on the base for making a groove extending partway through a tree from one side of the tree and thereby inducing a bending of the tree trunk and putting under tension fibres in the tree trunk near the opposite side. There is a shear mounted on the base for then shearing the tree from the opposite side.

33 Claims, 8 Drawing Figures

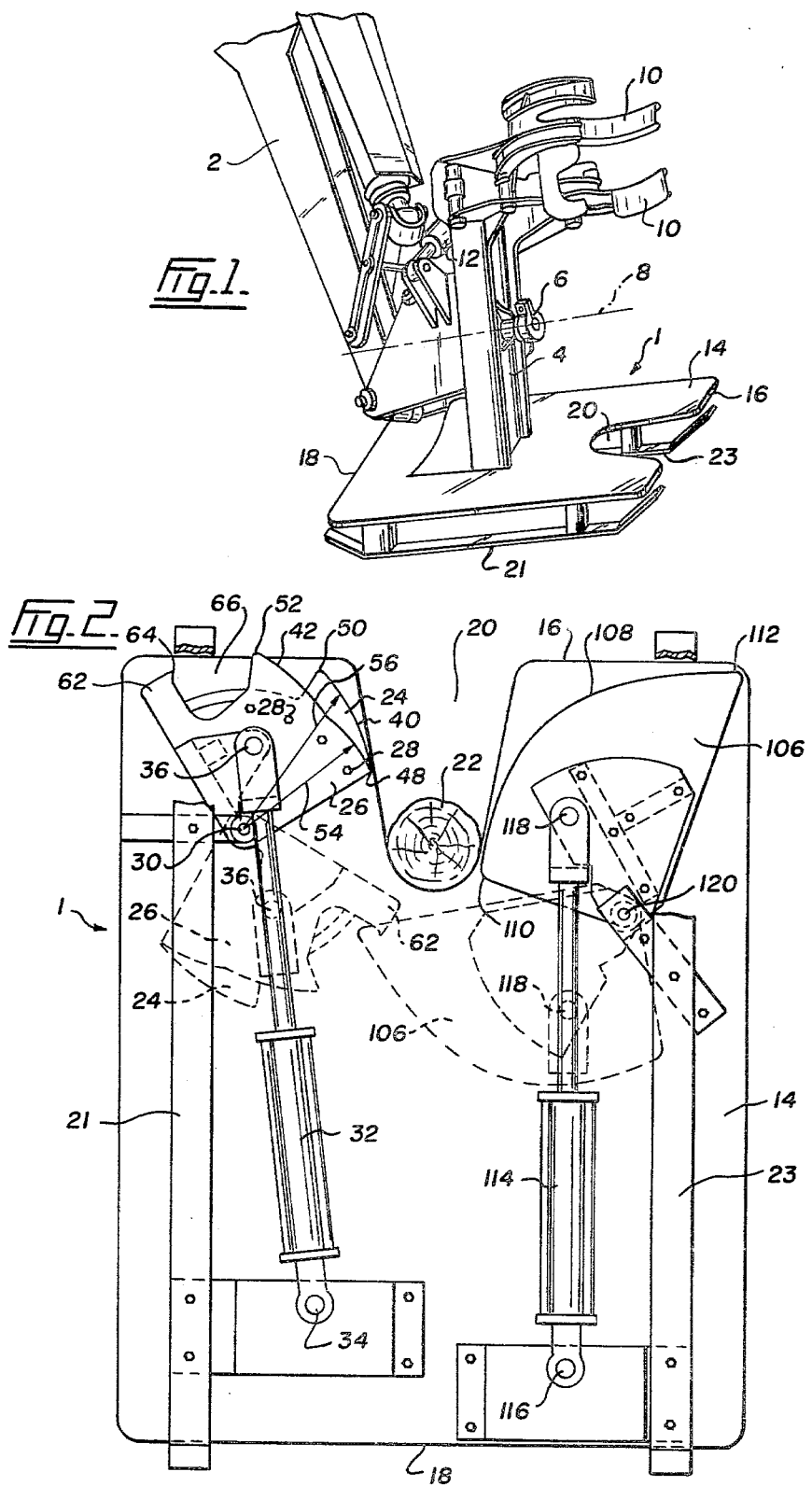

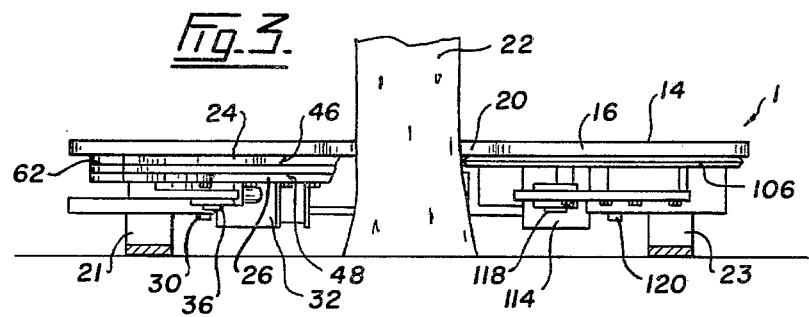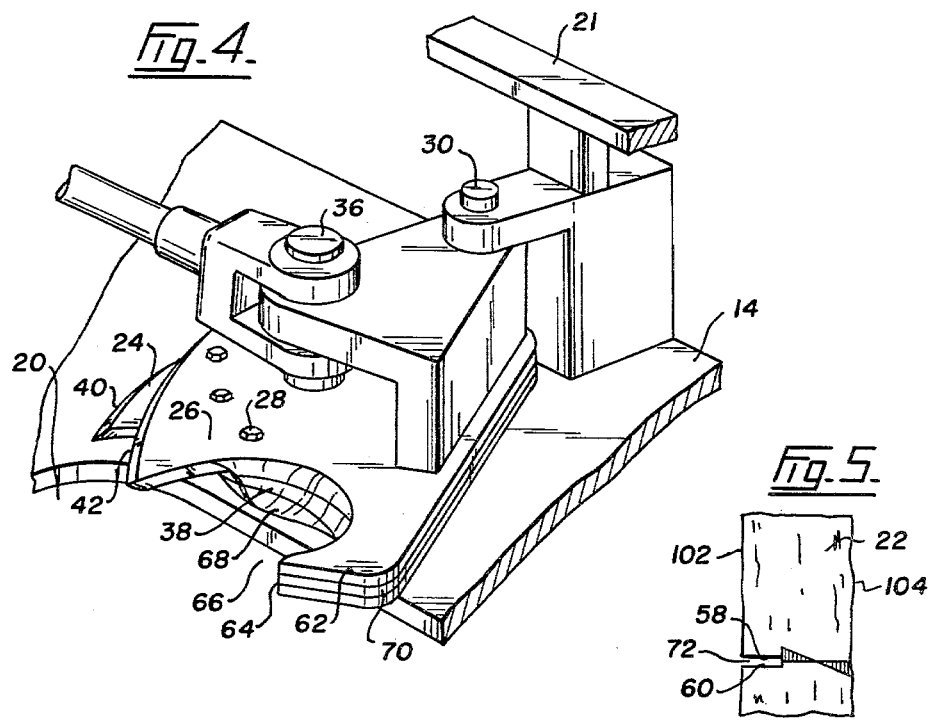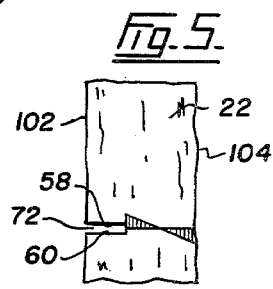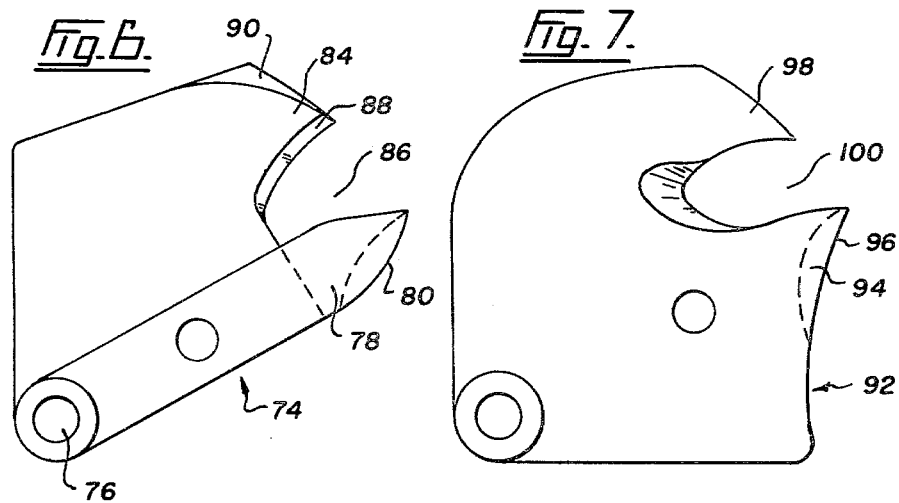

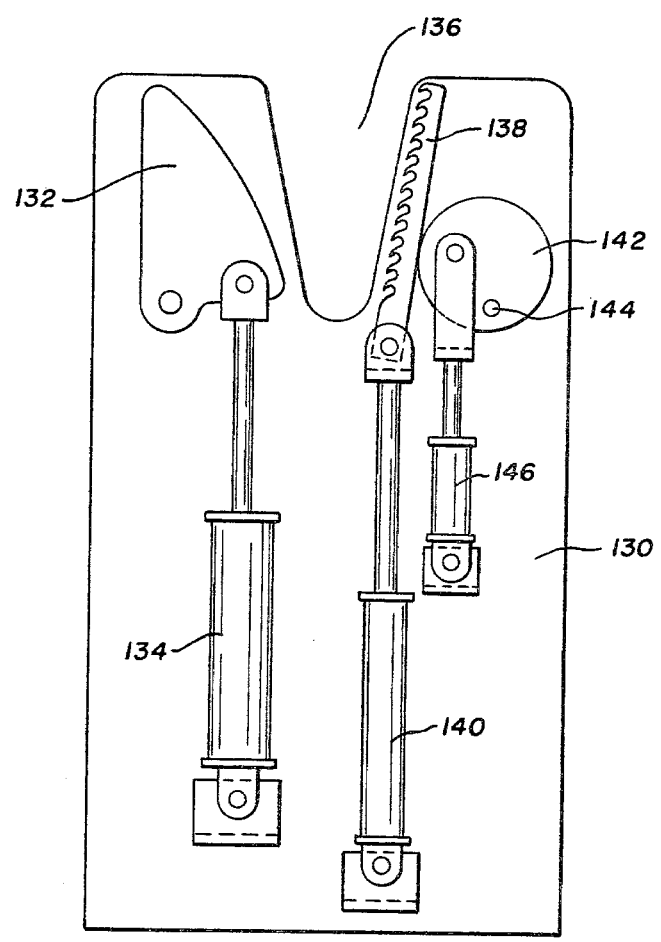

1

TREE SHEAR

BACKGROUND OF THE INVENTION

This invention relates to a tree shear.

Mechanization of forestry operations is increasingly important with the high cost of labour encountered in industrialized countries and the difficulty in recruiting personnel willing to work in remote areas. An example of the mechanization trend has been the development of mechanized tree felling devices. Many different mechanical fellers have been patented including those using chain saws and others employing shearing blades. For example, U.S. Pat. No. 4,131,145 to Puna describes a tree cutting device with two opposed knife blades. These blades are curved to form a bowl when their cutting edges are in contact. U.S. Pat. No. 3,627,002 to Fulghum discloses a tree shear having a blade with a somewhat elliptical shape. Other similar devices are found in U.S. Pat. Nos. 3,986,541 to Mclaughlin, 4,061,167 to Dunn, 3,646,975 to McNeil and 3,837,382 to Gaitten. Other patents are discussed in an article entitled "Analysis of Shear Felling of Trees" by R. B. Golob in the December, 1976 Forest Management Institute Information Report FMR-X-93.

Despite the large amount of research and development carried out, large plate-like tree shears have'nt had much commercial acceptance. This is probably due to their large size and weight and the consequent difficulty of maneuvering them through the forest.

SUMMARY OF THE INVENTION

According to the invention, a tree shear comprises a base having a position for receiving a tree trunk. There is undercutting means mounted on the base for making a groove extending partway through the tree trunk from one side of the tree, thereby inducing a bending of the tree trunk and putting under tension fibres in the trunk near a side thereof opposite the one side. There is shearing means mounted on the base for then shearing the tree from said opposite side.

The tree receiving position may comprise a tree receiving recess in the base, the undercutting means being to one side of the recess and the shearing means being to a side of the recess opposite the one side.

In a preferred form of the invention, the shearing means comprises a shearing blade and the undercutting means comprises spaced-apart, interconnected top and bottom undercutting blades and means for removing wood therebetween. The blade may have convexly curved cutting edges.

For example, the cutting edges may have first ends for first engaging the tree and second ends, the shear comprising means for pivoting the blades so the blades pass through the tree from the first ends to the second ends as the blades are pivoted. Preferably, each blade has a distance between the cutting edge of said each blade and the means pivotally connecting said each blade which increases from the first end to the second end of said each blade.

By employing the undercutting technique, and thereby tensioning fibres in the tree trunk on the side of the shearing means, the efficiency of the shearing operation is considerably improved. A cleaner shearing cut is achieved and crushing of the wood fibers is reduced. The ease of the shearing operation means that the weight of the shear can be reduced and the power requirements of the shearing means can also be reduced, meaning, for example, that a smaller fluid cylinder can be used. The lighter and more compact tree shearer which results is easier to maneuver through the trees and is more readily boom-mounted. Boom-mounting is preferred for reaching a plurality of trees from a single location and for reaching trees at locations not accessible by a vehicle.

The invention also offers significant advantages when compared with feller heads using power chain saws. The invention does not require the frequent sharpening, maintenance and replacement of chains encountered with chain saws.

In drawings which illustrate embodiments of the invention:

FIG. 1 is a perspective view showing the combination of a tree shear according to an embodiment of the invention, and a tree gripper mounted on the boom of a self-propelled vehicle;

FIG. 2 is a bottom plan view of the tree shear of FIG. 1;

FIG. 3 is a front elevational view of the tree shear;

FIG. 4 is a perspective view showing the undercutting means for the tree shear of FIGS. 1 to 3;

FIG. 5 is a diagram of a portion of a tree trunk showing the undercut on one side of the trunk and indicating the consequent tensioning near the opposite side of the tree;

FIGS. 6 and 7 are top plan views of alternative undercutting means for the tree shear; and FIG. 8 is a bottom plan view of a tree shear according to another embodiment of the invention.

DESCRIPTION OF THE PREFERRED EMBODIMENTS

FIG. 1 shows a tree shear 1 mounted on the boom 2 of a self-propelled vehicle. There is a vertical member 4 and a pivotal connection 6 which permits pivoting of the member 4 about the generally horizontal axis 8. The tree shear 1 is connected to the bottom of the member 4 below axis 8, while a tree gripper 10 is mounted on the top of member 4 above the axis 8. There is a fluid cylinder 12 for pivoting member 4 about the axis 8. The vehicle boom 2 and tree gripper 10 are all conventional and therefore will not be described further.

As seen best in FIGS. 2 and 3, the tree shear 1 includes a base 14 which, in the preferred embodiment, comprises a rectangular steel plate. However, if desired, the base may comprise a hollow housing with the mechanical components mounted internally. The base 14 has a front 16, a back 18 and a recess 20 which extends rearwardly from the front 16. The recess 20 comprises a position for receiving a tree trunk 22 which is to be cut. A pair of skids 21 and 23 are provided for resting shear 1 on a surface.

The shear 1 has means for undercutting the tree 22 which includes top undercutting blade 24 and bottom undercutting blade 26. Blades 24 and 26 are interconnected by a plurality of bolts 28. A link pin 30 comprises a common connecting means pivotally connecting blades 24 and 26 to the base 14. A fluid piston and cylinder combination 32 is pivotally connected to the bottom of the base at one end by a link pin 34 and is pivotally connected to the blades 24 and 26 at its opposite end by the link pin 36. Cylinder 32 comprises means for pivoting the blades 24 and 26 between the position before the tree is cut, as shown in solid lines in FIG. 2, to the position after the undercut is made, as shown in broken lines. While the two blades are interconnected, as best seen in FIG. 4 there is a space 38 therebetween.

Blade 24 has a convex cutting or shearing edge 40, while blade 26 has an equivalent edge 42. The edges 40 and 42 have first ends 46 and 48, which are adjacent to each other and adjacent to the recess 20 before the undercut is made. From their first ends, the edges 40 and 42 curve forwardly and laterally away from the recess 20 to their second ends 50 and 52 respectively. The elliptical shape of blade 24 means that the distance 56 between the cutting edge 40 and the pin 30 increases from the first end 46 to the second end 50 of the blade. The corresponding distance 54 of blade 26 increases in a similar manner between its first end 48 and its second end 52. It should also be noted that the second end 52 of blade 26 extends beyond the second end 50 of the blade 24. At the same time, the distance 56 of blade 24 increases at a greater rate from the first end 46 to the second end 50 than does the distance 54 for blade 26.

Because of the configuration of the undercutting means just described, blade 24 cuts into the tree 22 first, making the top cut 58 in the tree trunk 22 as shown in FIG. 5. This is followed by blade 26 which completes the bottom cut 60 once its second end 52 has cleared the tree. Both of these cuts extend into the tree 22 to the extent of the curved broken line shown in FIG. 2. In order to complete the groove extending partway through the tree, it is necessary to remove the wood between the cuts 58 and 60. This is accomplished by the rake tooth 62 with the pointed leading edge 64 which is spaced-apart from the second ends 50 and 52 of the blades 24 and 26 respectively by the gap 66. An edge 68, which is bevelled outwardly from blade 26 to blade 24, extends along the inside of gap 66. The rake tooth 62 comprises parts of the plates forming blades 24 and 26 and the plate 70 interposed therebetween. As rake tooth 62 is pulled through the tree 22 between the cuts 58 and 60 made by blades 24 and 26 respectively, it removes the wood therebetween and opens the groove 72.

While the combination of blades 24 and 26 and rake tooth 62 is the preferred form of the undercutting means, alternative means could be employed such as a pulled broach or the alternative means shown in FIGS. 6, 7 and 8. Providing two smooth cutting shears with a dado sandwiched there-between them in the conventional manner is not preferred because of the necessary cleaning out of the dado.

FIG. 6 shows an alternative undercutting means 74 which has an aperture 76 for the pin 30 shown in FIG. 2. The undercutting means 74 is rotated by a cylinder, such as cylinder 32. A pointed top undercutting blade 78 replaces the blade 24 of FIG. 2. Blade 78 has a cutting edge 80 which is bevelled downwardly and inwardly. In this way, blade 78 accomplishes a clean top cut 58 as shown in FIG. 5. Blade 78 is followed by the bottom undercutting blade 84 which is separated from blade 78 by a gap 86. Blade 84 has a downwardly and outwardly bevelled cutting edge 88 for making the bottom cut 60 of FIG. 5. The rake 90, for removing the wood between cuts 58 and 60 and clearing the groove 72, comprises the downwardly and outwardly bevelled trailing edge 90 of blade 84.

FIG. 7 shows a dado cutting device 92 which includes a pointed top blade 94 with a downwardly and inwardly bevelled cutting edge 96 for slicing the top cut 58 shown in FIG. 5. However, unlike the means of FIG. 2 or FIG. 6, this device does not include a bottom blade for making the bottom cut 60. Since the bottom cut would be made on the stump portion of the tree, it is not essential to have a smooth cut. Consequently, this means employs the pointed dado device 98 separated from blade 94 by the gap 100. The dado 98 widens the cut behind blade 96 by tearing away and removing wood fibers. The rough cut face remains on the stump and, consequently, will not affect the log quality. As a side effect, the roughened face may more readily permit the entry of water and saprophytic fungi into the stump, accelerating the decay process.

When the means for making the undercut employs two slicing blades, as for the preferred form of the invention of FIGS. 2, 3 and 4 and the device of FIG. 6, the second blade follows the first blade at a sufficient distance to preclude wedging between the blades of the wood eventually removed from the grooves. In the case of the preferred form of FIGS. 2, 3, and 4, the rake tooth 62 follows the second blade 26 at distance sufficient to minimize jamming of the wood before the blade 26 has completed its cut. However, tests indicate that the material being removed will fracture along the grain line and flow into the gullet between blades 24 and 26 and will not jam and cause crushing or tearing ahead of blade 26. Consequently, it is considered sufficient to have the tip of the first cutting blade just leaving the tree when the rake makes contact. It may be desirable to crowd the blades and rake as closely as possible in order to minimize the amount of rotation required for the blade assembly.

After the groove 72 is completed, the unsupported weight of the tree above groove 72 shifts towards the side 102 shown in FIG. 5. As illustrated, this induces a bending of the tree trunk which puts the fibres near side 104 under tension. Room is thus provided for shearing blade 106 and the shearing operation can then be performed efficient without substantial crushing of fibres.

While shearing blade 106 is the preferred shearing means, other shearing devices could be used to shear the tree from the side 104 which is put in tension by the formation of groove 72. Blade 106 is similar to the blades 24 and 26 and includes a convex cutting edge 108 which curves forwardly and laterally away from its first end 110, which is adjacent recess 20 before the tree 22 is cut, to its second end 112. A cylinder 114 is pivotally mounted on the base 14 by a pin 116 and is pivotally connected to blade 106 by a pin 118. Cylinder 114 provides means for pivoting blade 106 from the position shown in solid lines in FIG. 2 to the position shown in broken lines after the tree 22 has been sheared. Blade 106 is pivotally connected to base 114 by pin 120. Like blades 24 and 26, a blade 106 with the generally elliptical shape is preferred for the shearing operation, since such a blade is drawn through the tree in a slicing action which minimizes crushing and reduces power requirements.

In operation, the operator maneuvers the shear 1 utilizing the hydraulic controls of boom 2 so that the tree 2 is received within the recess 20 while the shear is in a generally horizontal position. While it is preferred to have a tree gripper, such as gripper 10, for gripping the tree above the shear 1, this is not essential. If desired, recess 20 could be made adjustable to fit a variation of tree sizes. This could be accomplished by the use of a divided plate comprising the base 14. Once the tree is received within the recess 20 and the tree secured by the gripper 10, if employed, the groove or undercut 72 is made by the undercutting means. In the case of the preferred form of the invention of FIGS. 1 to 4, the cylinder 32 is used to rotate the combination of blades 24 and 26 and rake 62 from the position shown in solid lines in FIG. 2 towards the position shown in broken lines. Blade 24 leads in completing the top cut 58 of FIG. 5 and is followed by blade 26 which completes the lower cut 60 thereafter. Rake 62 trails to remove the material between the cuts 58 and 60 and clears groove 72. The alternative devices of FIGS. 6 and 7 are similarly rotated by a cylinder and function in the manner as described above. Once groove 72 has been cleared, the tree tends to lean towards the groove placing the fibres near side 104 in tension. This effect can be accentuated by using gripper 10 to push the tree towards groove 72.

Next, after the undercut has been completed, the operator actuates cylinder 114 to rotate the shearing blade 106 from the position shown in solid lines in FIG. 2 to the position shown in broken lines. The slicing action of blade 106 is made more efficient and crushing is reduced since the tree is in tension at side 104. Once the shearing cut has been completed by blade 106, gripper 10 can be used to lift the tree 22 clear and place it at a desired position.

FIG. 8 shows another form of the invention which includes a base 130, a shearing blade 132 and a cylinder 134 for pivoting the shearing blade. The overall configuration of this embodiment is substantially the same as that of FIG. 2 except for the undercutting blades. The shearing blade is shown on the opposite side of the recess 136 when compared with FIG. 2, but that alternative is also feasible for the earlier embodiment.

In place of undercutting blades, the embodiment of FIG. 8 employs a broach 138 for the undercutting operation. A fluid cylinder 140 is used to pull the broach to form the undercut. An eccentric, circular cam 142 provides pressure on the back of the broach and forces it to cut. Cam 142 is pivotally connected to the base 130 by a pin 144. A cylinder 146 is used to rotate the cam.

After the undercut has been performed by broach 138, the bending action of the tree lifts the opposite side of the tree from the undercut. The shear is performed in the original manner by blade 132.

What is claimed is:

1. A tree shear comprising:
 a base having a position for receiving a tree trunk;
 undercutting means mounted on the base for making a groove extending through the tree trunk from one side of the tree thereby inducing a bending of the tree trunk and putting under tension fibres in the tree trunk near a side thereof opposite the one side;
 means to move the undercutting means to form said groove and to remove said undercutting means from the formed groove; and
 shearing means mounted on the base for shearing the tree from said opposite side after said undercutting means has been removed from said groove.

2. A shear as claimed in claim 1, the tree receiving position comprising a tree receiving recess in the base, the undercutting means being to one side of the recess and the shearing means being to a side of the recess opposite the one side.

3. A tree shear as claimed in claim 1, the undercutting means comprising a means for making a top cut and means for then removing material below the top cut to form the groove.

4. A tree shear as claimed in claim 3, the means for making the top cut comprising a blade.

5. A tree shear as claimed in claim 4, the means for removing comprising a rake connected to the blade and positioned to trail the blade through the tree.

6. A tree shear as claimed in claim 5, the rake and the blade being pivotally connected to the base, the shear comprising means for pivoting the rake and the blade to form the groove.

7. A tree shear as claimed in claim 2, the shearing means comprising a shearing blade.

8. A tree shear as claimed in claim 7, the undercutting means comprising spaced-apart, interconnected top and bottom undercutting blades and means for removing wood therebetween.

9. A tree shear as claimed in claim 8, the blades having convexly curved cutting edges.

10. A tree shear as claimed in claim 9, comprising first connecting means pivotally connecting the shearing blade to the base and second connecting means pivotally connecting the undercutting blades to the base.

11. A tree shear as claimed in claim 10, the cutting edges having first ends for first engaging the tree and second ends, the shear comprising means for simultaneously pivoting the blades so the blades pass through the tree from the first ends towards the second ends.

12. A tree shear as claimed in claim 11, each said blade having a distance between the cutting edge and the means pivotally connecting which increases from the first end to the second end.

13. A tree shear as claimed in claim 12, the distance between the means piovotally connecting and the cutting edges of the undercutting blades increasing at a greater rate from the first end to the second end of one said undercutting blade than for another said undercutting blade.

14. A tree shear as claimed in claim 13, the second end of said another undercutting blade extending beyond the second end of said one undercutting blade.

15. A tree shear as claimed in claim 14, the first ends of the undercutting blades being generally adjacent each other.

16. A tree shear as claimed in claim 15, the means for removing material comprising means connected to the undercutting blades for removing the material between the blades.

17. A tree shear as claimed in claim 16, the means for removing comprising a rake tooth.

18. A tree shear as claimed in claim 17, the rake tooth being connected to the undercutting blades beyond the second end of said one undercutting blade.

19. A tree shear as claimed in claim 17, the rake tooth being spaced-apart from the second ends of the undercutting blades.

20. A tree shear as claimed in claim 18, the means for pivoting the blades comprising fluid cylinders.

21. A tree shear as claimed in claim 13 or claim 20, said one undercutting blade being the top undercutting blade and said another undercutting blade being the bottom undercutting blade.

22. A tree shear as claimed in claim 11, the base having a front, the tree receiving recess being at the front of the base.

23. A tree shear as claimed in claim 22, the first ends of the cutting edges being adjacent the recess, and the cutting edges extending forwardly and laterally away from the recess, before the tree is cut.

24. A tree shear as claimed in claim 23, the means for pivoting the blades comprising fluid cylinders for pivoting the blades so the second ends of the cutting edges move towards the recess as the tree is cut.

25. A tree shear as claimed in claim 8 or claim 24, the top undercutting blade and the shearing blade being near a common elevation when the tree is cut.

26. A combination of a tree shear as claimed in claim 1 and a tree gripper having means for gripping the tree above the tree shear and means for pushing the tree towards the groove, thereby increasing the tension at said opposite side of the tree.

27. A combination as claimed in claim 26 comprising a member pivotally mounted on the end of a boom for pivoting about a generally horizontal axis, the shear being mounted on the member below the axis and the gripper being mounted on the member above the axis, the means for pushing comprising a fluid cylinder for pivoting the member about the axis.

28. A tree shear as claimed in claim 1, the undercutting means comprising a combination shearing blade and dado pivotally connected to the base, the shearing blade having a cutting edge for making a top cut and the dado being spaced-apart from the blade and positioned to clear material from the groove behind the blade as the combination is pivoted.

29. A tree shear as claimed in claim 8, the means for removing comprising a rake formed by a trailing edge of the bottom blade.

30. A tree shear as claimed in claim 1, the undercutting means comprising a broach, means for pulling the broach and means for providing pressure on the broach to force it against the tree trunk.

31. A tree shear as claimed in claim 30, the means for pulling the broach comprising a fluid cylinder.

32. A tree shear as claimed in claim 30, the means for providing pressure comprising a cam contacting the broach and means for rotating the cam.

33. A tree shear as claimed in claim 32, said cam being an eccentric, circular cam and the means for rotating the cam comprising a fluid cylinder.

* * * * *